United States Patent Office 3,430,017
Patented Feb. 25, 1969

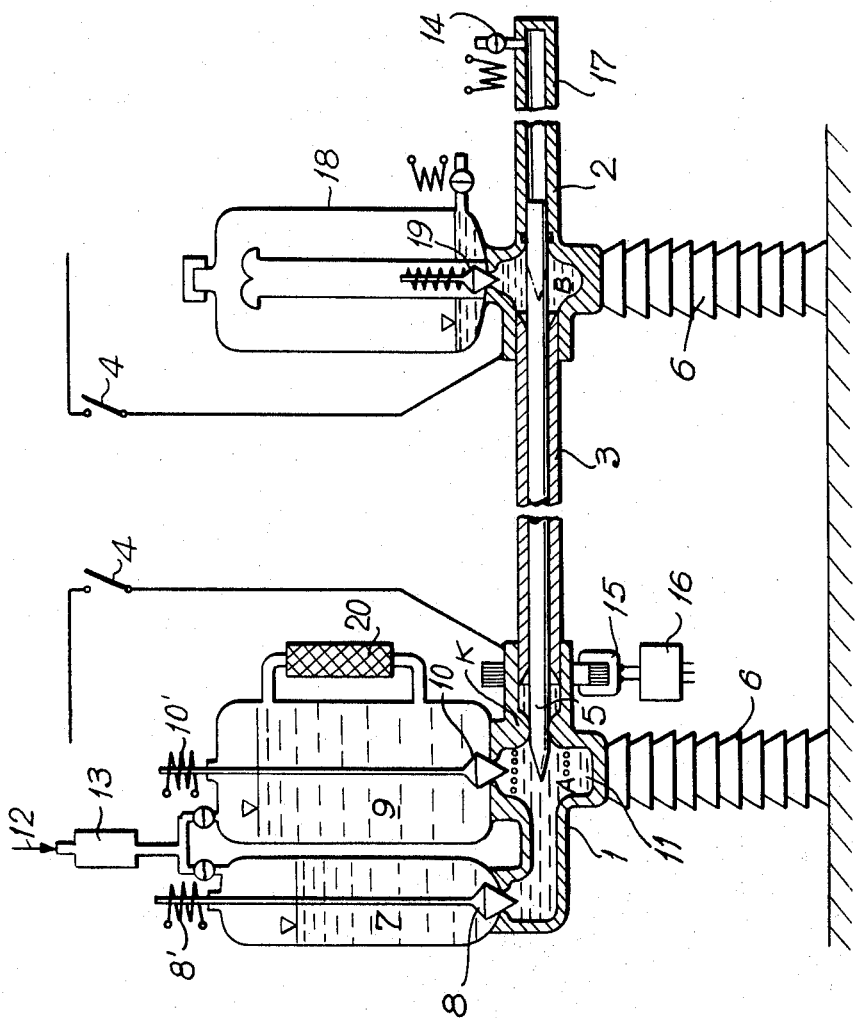

3,430,017
ARRANGEMENT FOR THE INTERRUPTION OF HIGH CURRENTS AT HIGH VOLTAGES
Bjarne Storsand, Watt, Switzerland, assignor to Oerlikon Engineering Company, a corporation of Switzerland
Filed Aug. 15, 1966, Ser. No. 572,586
Claims priority, application Switzerland, Aug. 17, 1965, 11,578/65
U.S. Cl. 200—144          13 Claims
Int. Cl. H01h 33/84; H01c 11/00

In alternating current systems, high currents can be disconnected in dependable manner even at high transmission voltages by arc switches which interrupt the current upon its passage through the zero point. However, it has not yet been possible to produce a switch which is suitable for disconnecting direct current of high voltage.

In the case of transmission of energy by means of high voltage direct current, it is therefore necessary, in the event of a disturbance, to free the system of voltage by blocking the rectifiers in order to interrupt the fault current. As a result, when these systems are used for the transmission of energy from the place of production to the place of distribution and use, it is not possible, as in the case of alternating current systems, to form tappings and networks for supplying a plurality of centers of consumption.

In order to be able to fully utilize the advantages of high voltage direct current transmission, there is thus an urgent need for a switch which can dependably and rapidly disconnect fault currents at the highest practical transmission voltages, which today are about 2×500,000 v. D.C., without it being necessary to remove voltage from the entire system on the direct current side. For this purpose, there has been proposed the use of rapidly variable electrolytic resistors which are connected in circuit.

The present invention relates to the special development of such a rapidly variable electrolytic resistor which permits the disconnecting of both direct current and alternating current in a rapid and dependable manner even at the highest voltages, and in connection with which, in particular, the switching voltage surges which occur can be maintained at a minimum. In accordance with the present invention, in order to interrupt high currents at high voltages in energy transmission systems, there is used an electrolytic resistor in the form of a tube, the tube having at least one movable electrode which can be moved rapidly from the metallic contact-making position to the position of the smallest value of conductivity of the resistor. The separating of the contacts takes place in an electrolyte of good conductivity with low voltage drop, and after the opening of the contact the conductivity of the resistor is reduced by the feeding of gradually diluted electrolyte down to the lowest conductivity which can be obtained. If an aqueous solution of an alkali compound is used as the electrolyte, it is then possible by feeding very pure water to vary the conductivity of the electrolyte within the limits of about 1 ohm/cm. up to 1 megohm/cm. It is thus possible to construct a resistor the ohmic value of which can be rapidly varied from metallic contact to several megohms.

In accordance with the invention, the resistor is formed of an insulating tube the two ends of which debouch into fixed electrodes and within which an axially movable contact pin is provided. The insulating tube is formed with a geometrical conductivity ratio $L/F > 1$ cm.$^{-1}$ in which $L$ is the electrode spacing in cm. and $F$ is the cross-sectional area in cm.$^2$. The tube is preferably made of a material which is an electrical insulator and which is not wetted by the electrolyte and not burnable, for instance, Teflon (polytetrafluorethylene).

In accordance with the invention, during the switching process the electrolyte is fed under pressure to the resistor, the electrolyte at the same time effecting the movement of the switch pin which is guided on one end in a stuffing box. The pressure employed on the electrolyte is preferably in the range between 5–50 atmospheres gauge, a spring-loaded valve at the pole where the electrolyte emerges assuring maintenance of the pressure in the tube during the switching process.

In accordance with the invention, the opening of the contact takes place in a cylindrical chamber, the outer walls of which are formed by one of the fixed electrodes. The chamber surrounds the movable electrode in such a manner that at first there is produced an electrolyte resistor of high conductivity which makes possible the conducting of high currents without the formation of an arc. In accordance with the invention, both the movable electrode and the electrolyte surrounding same have a high velocity at the time of separation of the movable electrode from the fixed electrode, the high velocity assuring the leading away of the gas bubbles and heat which are formed without fear of the formation of an arc.

In accordance with the invention, both the inlet and outlet openings of the insulating tube are formed as nozzles of favorable flow properties in order to make possible a high axial velocity of the electrolyte during the switching process. This velocity is selected so high that the joulean heat produced can be led away without vapor bubbles being formed in the electrolyte or on the electrodes themselves.

In accordance with the invention, the electrolyte which is stored in storage containers is placed in motion by means of $CO_2$-free compressed air or nitrogen. At least two storage chambers are present, one filled with electrolyte of good conductivity and the other with extremely pure water of very low conductivity. The two liquids are mixed in a mixing chamber which is located in front of the resistor, the control of the mixture ratio making it possible to obtain the conductivity desired for the switching process. In accordance with the invention, the control of the conductivity is effected in such a manner that an approximately linear decrease in current—$di/dt$ is obtained during the switching process.

In accordance with the invention, the residual current which still flows even after the switching device has reached its maximum resistance, of the order of magnitude of at least 1 megohm, is interrupted by blowing the switching device with compressed air, or by means of a separate interrupting device connected in series. An R-C member connected across the switching device dampens the excess voltage produced thereby.

The figure shows one embodiment of such a switch in simplified fashion.

1 and 2 are two fixed poles, or pole electrodes, of the switch which are connected with each other by an insulating tub 3 of Teflon or the like. If $L$ is the length and $F$ the cross-section of the tube, then $L/F > 1$ cm.$^{-1}$. 4 are cut-out switches in the electrical feed and discharge lines. 5 is an axially movable pole or switch pin which can move from the closed position indicated by the letter A to the fully open position shown in dot-dash lines and indicated by the letter B. The end surface of the pin 5 is provided with axial grooves. A guide cylinder 17 accommodates the switch pin in the end position B. 6 are insulators. 7 is an electrolyte container having a valve 8 controlled by a solenoid 8'. 9 is a pure-water container having a valve 10 controlled by a solenoid 10'. 12 is a compressed air feed via the $CO_2$ absorber 13. The switch is closed, i.e., the pin 5 is moved to its closed position A, by compressed air, possibly with the interposition of an electrolyte, via the valve 14. 15 is a current rise or current change transformer whose output controls the mixture ratio via the control apparatus 16.

In closed condition, the movable electrode 5 is in the end position A. The mixing chamber 11 is filled with an electrolyte of good conductivity. By opening the valve 8, electrolyte flows under pressure into the mixing chamber and over the grooved surface of electrode 5 and pushes electrode 5 into the open end position B. At the desired moment during the switching process, the valve 10 is opened and valve 8 is gradually closed, whereby the conductivity of the electrolyte decreases from the value of the solution in container 7 to a value of the pure water ing container 9. The heated liquid is collected in a receiving container 18 having a spring-loaded valve 19 and discharged after the disconnection is completed. After the resistor has reached its lowest conductivity value, i.e., after the emptying of container 9, gas under pressure is blown through the switch and extinguishes the final current which, depending on the voltage, has a value of from 0.1–0.5 ampere.

Before the pin 5 is moved back to position A, the container 9 must be filled with distilled water, or the like, and the container 18 emptied. It may be advisable to keep the water in container 9 continuously at maximum purity by installing an ion exchanger 20.

The arrangement in accordance with the invention makes it possible in a very short time, and with voltages which are practically of any value, to disconnect both A.C. and D.C. short-circuits in high voltage energy transmission systems. The resistance of the switch is controlled as a function of time. If U designates the no-load voltage of the system and $R_K$ the internal resistance thereof, then the maximum short-circuit current which occurs is $J_K = U/R_K$. If the total switch time is $t_s$, then with linear decrease in current:

$$J = J_k \frac{t_s - t}{t_s} = \frac{U}{R_K + R}$$

From this, we have:

$$R = \frac{U - t_s}{J_K(t_s - t)} - R_K = R_K \frac{t}{t_s - t}$$

The rate of decrease in current decreases towards the end of the switching process, however, and the current asymptotically approaches the minimum value.

Control of the electrolyte can also be effected by valves in the compressed air circuit, in which case the valves 8 and 10 are replaced by non-return valves.

Since a relatively small amount of electrolyte corresponding to the volume of the mixing chamber 11 and tube 3 is sufficient for the first switching phase, it is possible in accordance with the invention for this predetermined quantity to be metered and injected by a pump piston which can be installed, for instance, in container 7. In this way, some switching time can be saved without, however, in any way changing the principle of the invention.

The fixed contact point K also has axial slits which permit a flow of the electrolyte before the opening of the contact, i.e., before pin 5 disengages pole 1.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An arrangement for interrupting high currents at high voltages by means of an electrolytic resistor, said resistor comprising two spaced-apart pole electrodes, a tube joining said pole electrodes, and at least one movable electrode arranged for axial movement within said tube between a closed position in which it electrically connects said pole electrodes and an open position in which it is out of engagement with at least one of said pole electrodes, means for introducing into said tube an electrolyte of relatively high conductivity during the initial movement of said movable electrode from its closed toward its open position, and means for gradually introducing into said tube an electrolyte of relatively poor conductivity after said movable electrode moves out of its closed position.

2. An arrangement according to claim 1, characterized by the fact that the ratio of the length of said tube to its cross-sectional area is $>1$ cm.$^{-1}$.

3. An arrangement according to claim 1, characterized by the fact that the tube is formed of a material which is not wetted by the electrolyte.

4. An arrangement according to claim 3, characterized by the fact that the tube is formed of a material having a base of tetrafluorethylene.

5. An arrangement according to claim 1, characterized by the fact that said electrolyte-introducing means feeds electrolyte to the tube under pressure, the pressurized electrolyte thereby effecting the movement of the movable electrode and preventing the production of gas and vapor bubbles.

6. An arrangement according to claim 1, characterized by the fact that the pole electrode with which the movable electrode moves into and out of engagement is in the form of a cylindrical chamber adapted to be filled with an electrolyte, said chamber surrounding the movable electrode in such a manner that upon the initial movement of the movable electrode from its closed position there is produced an electrolyte resistor of small resistance which permits the feeding of large currents without danger of formation of an arc.

7. An arrangement according to claim 1, characterized by the fact that the surface of the movable electrode is provided with longitudinal grooves in order to increase its surface area and make possible the axial flow of electrolyte before the disengagement of the movable electrode and said one pole electrode.

8. An arrangement according to claim 1, characterized by the fact that the ends of the tube are formed with favorable flow properties in order to make possible a high velocity of electrolyte during the switching process.

9. An arrangement according to claim 1, characterized by the fact that each of said electrolyte-introducing means includes an electrolyte container and a valve for controlling the flow from the container, one of said containers containing an electrolyte of maximum conductivity and the other an electrolyte of the lowest possible conductivity, and a mixing chamber for mixing said electrolytes, the mixing be controlled by said valves.

10. An arrangement according to claim 9, including means for applying $CO_2$-free gas under pressure to the surface of the electrolyte in each container to effect movement of said electrolyte from said container into said mixing chamber.

11. An arrangement according to claim 1, including means for blowing out the tube with gas under pressure at the end of the switching process in order to extinguish the residual current.

12. An arrangement according to claim 11, characterized by the fact that R-C members are provided to reduce the over-voltage upon the final disconnecting.

13. An arrangement according to claim 1, including a pump piston for injecting the amount of electrolyte of high conductivity required for the first phase of the switching process.

References Cited

UNITED STATES PATENTS

| | | | |
|---|---|---|---|
| 468,119 | 2/1892 | Thomson | 200—144 |
| 622,627 | 4/1899 | Lyon | 338—81 |
| 1,233,959 | 7/1917 | Bennett | 338—81 |
| 2,548,745 | 4/1951 | Smith | 338—81 |

FOREIGN PATENTS

| | | |
|---|---|---|
| 213,728 | 9/1909 | Germany. |
| 368,947 | 3/1932 | Great Britain. |

ROBERT S. MACON, *Primary Examiner.*

U.S. Cl. X.R.

338—13, 56, 81, 222; 200—148, 150